US008831760B2

(12) United States Patent
Gupta et al.

(10) Patent No.: US 8,831,760 B2
(45) Date of Patent: Sep. 9, 2014

(54) CONTENT BASED AUDIO COPY DETECTION

(75) Inventors: Vishwa Gupta, Brossard (CA); Gilles Boulianne, Saint-Pie (CA); Patrick Cardnal, Verdun (CA)

(73) Assignee: (CRIM) Centre de Recherche Informatique de Montreal, Montreal, Quebec (CA)

( * ) Notice: Subject to any disclaimer, the term of this patent is extended or adjusted under 35 U.S.C. 154(b) by 507 days.

(21) Appl. No.: 12/896,582

(22) Filed: Oct. 1, 2010

(65) Prior Publication Data

US 2011/0082877 A1 Apr. 7, 2011

Related U.S. Application Data

(60) Provisional application No. 61/247,728, filed on Oct. 1, 2009.

(51) Int. Cl.

| | |
|---|---|
| ***G06F 17/00*** | (2006.01) |
| ***G10L 25/00*** | (2013.01) |
| *G10H 1/00* | (2006.01) |
| *G10L 25/24* | (2013.01) |

(52) U.S. Cl.
CPC .......... *G10L 25/00* (2013.01); *G10H 2210/031* (2013.01); *G10H 1/0008* (2013.01); *G10H 2240/141* (2013.01); *G10L 25/24* (2013.01)
USPC ........................................................... 700/94

(58) Field of Classification Search
CPC .................... G06F 17/30743; G06F 17/30778; G10H 2210/31; G10H 2210/41
USPC .................................... 700/94; 704/500–504
See application file for complete search history.

(56) References Cited

U.S. PATENT DOCUMENTS

| | | | | |
|---|---|---|---|---|
| 5,606,655 | A | 2/1997 | Arman et al. | |
| 7,359,889 | B2 * | 4/2008 | Wang et al. | 707/661 |
| 2004/0258397 | A1 | 12/2004 | Kim | |
| 2005/0091275 | A1 * | 4/2005 | Burges et al. | 707/104.1 |
| 2005/0243103 | A1 | 11/2005 | Rudolph | |
| 2006/0182368 | A1 | 8/2006 | Kim | |
| 2008/0317278 | A1 | 12/2008 | Lefebvre et al. | |
| 2009/0154806 | A1 | 6/2009 | Chang et al. | |
| 2010/0085481 | A1 | 4/2010 | Winter et al. | |
| 2010/0247073 | A1 | 9/2010 | Nam et al. | |
| 2010/0329547 | A1 | 12/2010 | Cavet | |

OTHER PUBLICATIONS

Cardinal et al., "Content-Based Advertisement Detection", Interspeech 2010, Makuhari, Chiba, Japan, Sep. 26-30, 2010, pp. 2214-2217.

(Continued)

*Primary Examiner* — Andrew C Flanders
(74) *Attorney, Agent, or Firm* — Wilmer Cutler Pickering Hale and Dorr LLP

(57) ABSTRACT

A method for performing audio copy detection, comprising, providing a query audio data, the query audio data having a succession of frames and also providing a plurality of test audio data units, each test audio data unit including a succession of frames. For each test audio data unit the method generates a test fingerprint set. The generation of the test fingerprint test including computing similarity measurements between at least one frame of the test audio data and a plurality of frames of the query audio data. A test audio data unit is then selected as a match for the query audio data at least in part on the basis of the fingerprint sets.

19 Claims, 4 Drawing Sheets

(56) References Cited

OTHER PUBLICATIONS

Gupta et al., "CRIM's Content-based Audio Copy Detection System for TRECVID 2009", Multimedia Tools and Applications, 2010, Springer Netherlands, DOI: 10.1007/s11042-010-0608-x, Sep. 30, 2010, 16 pages.
Kraaij et al., "TRECVID 2009 Content-based Copy Detection task Overview", 2009, www-nlpir.nist.gov/projects/tvpubs/tv.pubs.org.html#2009, Dec. 7, 2009, 76 pages.
Kraaij et al., "TRECVID 2010 Content based Copy Detection task overview", 2010, www-nlpir.nist.gov/projects/tvpubs/tv.pubs.org.html, Mar. 1, 2011, 26 pages.
Kraaij et al., "TRECVID-2008 Content-based Copy Detection task Overview", www-nlpir.nist.gov/projects/tvpubs/tv8.slides/CBCD.slides.pdf, Dec. 17, 2008, 33 pages.
Li et al., "PKU—IDM @ TRECVid 2010: Copy Detection with Visual-Audio Feature Fusion and Sequential Pyramid Matching", www-nlpir.nist.gov/projects/tvpubs/tv.pubs.org.html, Mar. 1, 2011, 6 pages.
Liu et al., "AT&T Research at TRECVID 2009 Content-based Copy Detection", 2009, www-nlpir.nist.gov/projects/tvpubs/tv.pubs.org.html#2009, Mar. 1, 2010, 8 pages.
Over et al., "Guidelines for the TRECVID 2009 Evaluation", www-nlpir.nist.gov/projects/tv2009/, NIST—National Institute of Standards and Technology, Jan. 26, 2010, 15 pages.
Mukai et al., "NTT Communications Science Laboratories at TRECVID 2010 Content-Based Copy Detection", Proc. TRECVID 2010, Gaitersburg, MD, USA, Mar. 1, 2011, 10 pages.
Office Action for U.S. Appl. No. 13/310,092 mailed Mar. 14, 2013. 24 pages.

* cited by examiner

CONTENT BASED AUDIO COPY DETECTION

CROSS-REFERENCE TO RELATED APPLICATIONS

This application claims the benefit of and priority to U.S. provisional application No. 61/247,728 filed Oct. 1, 2009, the context of which is herein incorporated by reference.

FIELD OF THE INVENTION

The present invention relates to techniques for determining if audio data that may be broadcast, transmitted in a communication channel or played is a copy of an audio piece within a repository. Those techniques can be used to perform copy detection for copyright infringement purposes or for advertisement monitoring purposes.

BACKGROUND OF THE INVENTION

There are many applications of content-based audio copy detection. It can be used to monitor peer-to-peer copying of music or any copyrighted audio over the internet. Global digital music trade revenues exceeded $3.7 billion in 2008 ("IFPI digital music report 2009" www.ifpi.org/cpmtemt/library/dmr2009.pdf) and grew rapidly in 2009 to reach an estimated $4.2 billion ("IFPI digital music report 2010" www.ifpi.org/cpmtemt/library/dmr2010.pdf). The digital track sales in the US increased from $0.844 billion in 2007 to $1.07 billion in 2008, and to $1.16 billion in 2009. These figures do not include peer-to-peer download of music and songs that may or may not be legal. The music industry believes that peer-to-peer file sharing has led to billions in lost sales. Fast and effective copy detection will allow ISPs to monitor such activity at a reasonable cost.

Content-based audio copy detection can also be used to monitor advertisement campaigns over TV and radio broadcasts. Many companies that advertise not only monitor their advertisements, but follow the ad campaigns of their competitors for business intelligence purposes. Worldwide, the TV and radio advertising market amounted to over $214 billion dollars in 2008. In the US alone, TV and radio advertisements amounted to over $82 billion dollars in 2008.

Currently, monitoring of ad campaigns is being offered as a service by many companies worldwide. Some companies offer watermarking for automated monitoring of ads. In watermarking audio, a unique code is embedded in the audio before it is broadcast. This code can then be retrieved by watermark monitoring equipment. However, watermarking every commercial and then monitoring by specialized equipment is expensive. Furthermore, watermarking only allows companies to monitor their own ads that have been watermarked. They cannot follow the campaigns of their competitors for business intelligence. Content-based audio copy detection would alleviate many such constraints imposed by watermarking.

Published papers from the audio copy detection and advertisement detection fields show that the two fields have evolved differently. In audio copy detection (J. Haitsma, T. Kalker, "A highly robust audio fingerprinting system", [online] ismir2002.ismir.net/proeeedings/02-FP04-2.pdf and Y. Ke, D. Hoiem, and R. Sukthankar, "Computer vision for music identification", Proc. Compo Vision Pattern Recog., 2005), the emphasis is on speed, since the alleged copy is compared with a large repository of copyrighted audio pieces. A small percentage of misses will not make a big difference so long as most of the copies are captured. The system has to be robust under various coding schemes and distortions that audio may go through over the Internet. Fast audio copy detection uses audio fingerprints. The audio fingerprints proposed by Haitsma and Kalker (J. Haitsma, T. Kalker, "A highly robust audio fingerprinting system", [online] ismir2002.ismir.net/proeeedings/02-FP04-2.pdf) have been found to be quite robust to various distortions of the audio signals. These fingerprints have been used for music search (N. Hurley, F. Balado, E. McCarthy, G. Silvestre, "Performance of Phillips Audio Fingerprinting under Desynchronisation,", [online] ismir2007.ismir.net/proceedings/ISMIR2007_p133_hurley.Pdf). These fingerprints have also been proposed for controlling peer-to-peer music sharing over the Internet (P. Shrestha, T. Kalker, "Audio Fingerprinting In Peer-to-peer Networks,", [online] ismir2004.ismir.net/proceedings/p062-page-341-paper91.pdf), and for measuring sound quality (P. Docts, R. Lagendijk, "Extracting Quality Parameters for Compressed Audio from Fingerprints, ", [online] ismir2005.ismir.net/proceedings/1063.pdf). These audio fingerprints use energy differences in consecutive bands to generate a feature expressed in 32 bits. The audio search using these fingerprints is speeded up by looking for exact match of these 32 bits in the stored repository. A more complete search is only performed around the frames corresponding to these matching fingerprints. This complete search involves computing bit matches and a threshold in order to find matching segments. This search is expensive because of the computing involved in the bit matching.

In contrast, within the advertisement detection field, the emphasis is focused more on finding all the ads broadcast in the campaign (M. Covell, S. Baluja, and M. Fink, "Advertisement Detection and Replacement using Acoustic and Visual Repetition", IEEE Workshop multimedia sig. proc., October 2006, pp. 461-466) (P. Duygulu, M. Chen, and A. Hauptmann, "Comparison and combination of two novel commercial detection methods", Proc. ICME, 2004, pp. 1267-1270) (V. Gupta, G. Boulianne, P. Kenny, and P. Dumouchel, "Advertisement Detection in French Broadcast News using Acoustic repetition and Gaussian Mixture Models", Proc. InterSpeeeh 2008, Brisbane, Australia). This type of search is generally exhaustive. The process is speeded up by first using a fast search strategy that overgenerates the possible advertisement matches. These matches are then compared using a detailed match. In many instances, the detailed match includes comparing video features, although in some instances, the same audio may be played even though the video frames may be different.

Accordingly, there exists in the industry a need to provide improved solutions for content-based copy detection.

SUMMARY OF THE INVENTION

As embodied and broadly described herein the invention provides a method for performing audio copy detection, comprising, providing a query audio data, the query audio data having a succession of frames and also providing a plurality of test audio data units, each test audio data unit including a succession of frames. For each test audio data unit the method generates a test fingerprint set. The generation of the test fingerprint set including computing similarity measurements between at least one frame of the test audio data and a plurality of frames of the query audio data. A test audio data unit is then selected as a match for the query audio data at least in part on the basis of the fingerprint sets.

As embodied and broadly described herein, the invention also provides a method for performing audio copy detection, comprising providing a query audio data, the query audio data having a succession of frames and also providing a plurality of test audio data units, each test audio data unit including a succession of frames. The query audio data and each test audio data unit are processed with software to derive a plurality of fingerprint sets, each fingerprint set being associated with the query audio data and a respective test audio data unit combination. The plurality of fingerprint sets and the query audio data are further processed to identify a fingerprint set that best matches the query audio.

As embodied and broadly described herein, the invention further provides a method for generating a group of fingerprint sets for performing audio copy detection. The method includes providing query audio data having a succession of frames and also providing a plurality of test audio data units, each test audio data units having a succession of frames. A group of fingerprint sets is computed, for each fingerprint set the computing including mapping frames of a test audio data unit to corresponding frames of the query audio data on the basis of similarity measurement between the frames.

As embodied and broadly described herein, the invention also provides a method for performing audio copy detection, comprising providing a query audio data having a succession of frames and deriving a set of query audio fingerprints from audio information conveyed by the query audio data, frames in the succession being associated with respective fingerprints in the set. The method further provides a group of test audio fingerprint sets, each fingerprint set uniquely representing a test audio data unit and also providing a map linking fingerprints in the query audio fingerprint set to frame positions in the succession, wherein the map establishes a relationship between each fingerprint in the query audio fingerprint set and the positions of one or more frames in the succession associated with the fingerprint. For each test audio fingerprint set the method identifies via the map the fingerprints in the test audio fingerprint set matching the fingerprints in the query audio set and selecting on the basis of the identifying the test audio data unit that corresponds to the query audio data.

As embodied and broadly described herein, the invention provides an apparatus for performing audio copy detection, comprising an input for receiving query audio data, the query audio data having a succession of frames and a machine readable storage holding a plurality of test audio data units, each test audio data unit including a succession of frames. The machine readable storage being encoded with software for execution by a CPU for computing similarity measurements between a frame of every test audio data unit and a plurality of frames of the query audio data, to generate a test fingerprint set for each test audio data unit, software selecting at least in part on the basis of the fingerprints sets a test audio data unit as a match for the query audio data. The apparatus also comprising an output for releasing information conveying the selected test audio data unit.

As embodied and broadly described herein, the invention provides an apparatus for performing audio copy detection, comprising an input for receiving query audio data, the query audio data having a succession of frames, and a machine readable storage for holding a plurality of test audio data units, each test audio data unit including a succession of frames. The machine readable storage being encoded with software for execution by a CPU, the software processing the query audio data and each test audio data unit to derive a plurality of fingerprint sets, each fingerprint set being associated with the query audio data and a respective test audio data unit combination. The software processing the plurality of fingerprint sets and the query audio data to identify a fingerprint set and a corresponding test audio data unit that matches the query audio.

As embodied and broadly described herein, the invention also provides an apparatus for generating a group of fingerprint sets for performing audio copy detection, the apparatus comprising an input for receiving query audio data having a succession of frames and a machine readable storage holding a plurality of test audio data units, each test audio data units having a succession of frames. The machine readable storage is encoded with software for execution by a CPU for computing the group of fingerprint sets, for each fingerprint set the software mapping frames of a test audio data unit to corresponding frames of the query audio data on the basis of similarity measurement between frames.

As embodied and broadly described herein, the invention also includes an apparatus for performing audio copy detection, comprising an input for receiving query audio data having a succession of frames and a machine readable storage encoded with software for execution by a CPU for deriving a set of query audio fingerprints from audio information conveyed by the query audio data, frames in the succession being associated with respective fingerprints in the set. The machine readable storage holding a group of test audio fingerprint sets, each fingerprint set uniquely representing a test audio data unit. The machine readable storage also holding a map linking fingerprints in the query audio fingerprint set to frame positions in the succession, wherein the map establishes a relationship between each fingerprint in the query audio fingerprint set and the positions of one or more frames in the succession associated with the fingerprint. For each test audio fingerprint set the software identifying via the map the fingerprints in the test audio fingerprint set matching the fingerprints in the query audio set and selecting on the basis of the identifying the test audio data unit that corresponds to the query audio data.

BRIEF DESCRIPTION OF THE DRAWINGS

A detailed description of examples of implementation of the present invention is provided hereinbelow with reference to the following drawings, in which.

Figure 1:
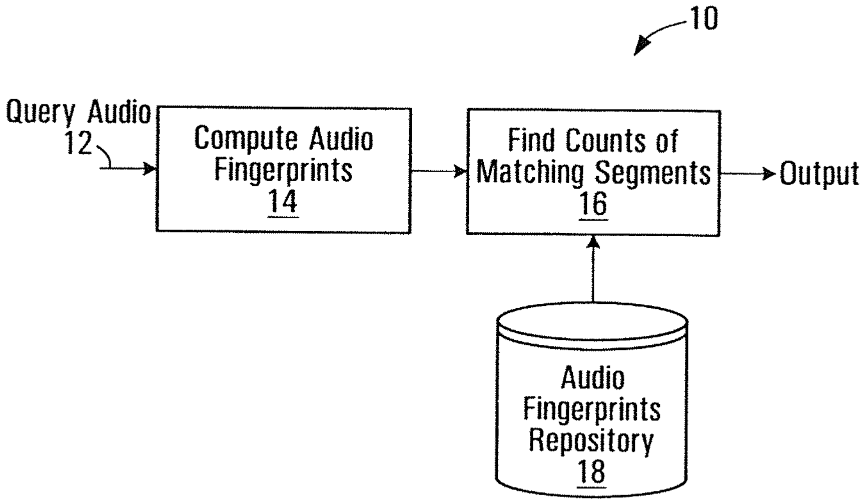
FIG. 1 is block diagram of a system for performing copy detection that matches audio fingerprints in a query audio to audio fingerprints of audio pieces in a repository.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

The overall system 10 shown in FIG. 1 is computer implemented and uses software encoded on a machine-readable storage for execution on a Central Processing Unit (CPU) to perform the various computations described below. Query audio 12 is applied at the input of the system 10. The query audio is a digital or analog signal that conveys audio information. The audio information can be speech, music or movie soundtrack, among others. Step 14 computes the audio fingerprints of the audio query. In a specific example of implementation, there is one fingerprint per 10 ms of audio frame but this can vary. Each fingerprint is an integer value that characterizes the frame.

The fingerprints that are computed at step 14 are processed at step 16 that tries to determine if the fingerprints match a set of fingerprints in a repository 18. The repository 18, which can be implemented as a component or segment of the machine readable storage of the computer, contains a multitude of fingerprint sets associated with respective audio pieces, where each audio piece can be a song, the soundtrack of a movie or an audio book, among others. In this specification, the fingerprints in the repository 18 are referred to as "test fingerprints". In the context of copy detection, the repository 18 holds fingerprints of copyrighted audio material that is to be detected in a stream of query audio. In a different application, when monitoring advertisements, the repository 18 holds fingerprints of ads that are being monitored. The query audio in this case corresponds to the broadcast program segment being searched for ads.

Audio fingerprints allow for quickly matching segments of the query audio by counting the fingerprints that match exactly in the corresponding test segments. Two different audio fingerprints can be considered. One fingerprinting method is based on energy differences in consecutive sub-bands and results in a very fast search. The other fingerprints are based on classification of each frame of the test to the nearest frame (nearest neighbor) of the query. These fingerprints provide even better performance. While the nearest neighbor fingerprints are slower to compute, the computation can be speeded up by parallel processing on a Graphical Processing Unit (GPU).

The fingerprints are used to find test segments that may be copies of the queries. Fingerprint matching is done by moving the query over the test and counting the total fingerprint matches for each alignment of the query with the test. In other words, the search is done by moving the query audio (n frames) over the test (m frames) and counting the number of fingerprint matches for each possible alignment of the query audio and the test.

Figure 3:
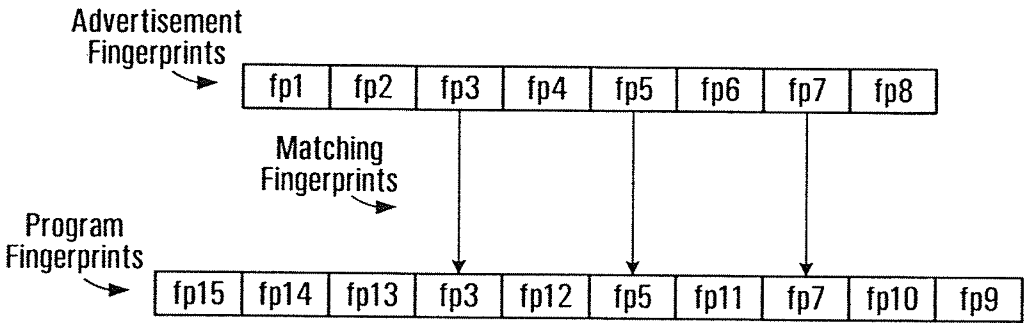
FIG. 3 is a graphic example showing how audio fingerprints of a query audio are matched to audio fingerprints in a repository.

An example of one such alignment is shown in FIG. 3. In this alignment, the matching test segment is identified by the matching start frame (frame 3), the last matching frame (frame 7), and the number of fingerprint matches (3 matches). If the query audio is delivered at 100 frames/sec, then the count/sec will be 3*100/(7−3+1)=60. In other words, counts/sec is estimated as:

$$\text{counts/sec} = \frac{(\text{total matching frames}) * (\text{frames/sec})}{(\text{last matching frame}) - (\text{first matching frame}) + 1}$$

Both the counts and counts/sec values can used to determine if a match exists. Since the same query is matched against all the test segments in the repository 18, the total count can be a better measure of match between the query and the test segment in certain cases. The reason for this is that counts/sec can vary even though the count (or the number of frame matches) is the same. Therefore, counts can be used when the system is searching for the best matching test segment for a given query. However, when comparing matches for different queries, counts/sec is a more consistent measure, since the queries can vary in duration. For example, queries having respective lengths of 3 seconds and 3 minutes will have very different counts, but similar counts/sec. This is the case when the scores across queries are compared to reject query matches that may be false alarms.

During the search, segments that match the query can overlap with one another. In this case, the overlaps that are found to be synchronized are combined and overlaps with low counts are removed. Overlaps are synchronized if the start of the query (when the query is overlaid on test) differs by less than 2 frames. In such a case the two counts are added and only the segment with the higher count is retained. In all other cases of overlap, the overlap is removed with the lower count. This is an optional enhancement and it only has a small influence on copy detection accuracy. The algorithms work as follows:

Extension

Consider two alignments $a_1$ and $a_2$. Both alignments are synchronized if $$|(p\mathrm{Start}[a_1]-p\mathrm{Start}[a_2])-(a\mathrm{Start}[a_1]-a\mathrm{Start}[a_2])|\leq 2$$

where pStar[a] and aStart[a] are respectively the first matching frame in the audio segment and the first matching frame in the advertisement for the alignment a.

If two alignments are synchronized, the one with the lower count is eliminated and its count is added to the remaining one.

Overlap

Two alignments $a_1$ and $a_2$ overlap if the following conditions are met:

$$p\mathrm{Start}[a_2]<p\mathrm{End}[a_1] \text{ and } p\mathrm{End}[a_2]>p\mathrm{Start}[a_1]$$

where pStar[a] and pEnd[a] are respectively the first and last matching frame in the audio segment for the alignment a. When two alignments overlap, the one with lower count is eliminated.

Figure 2:
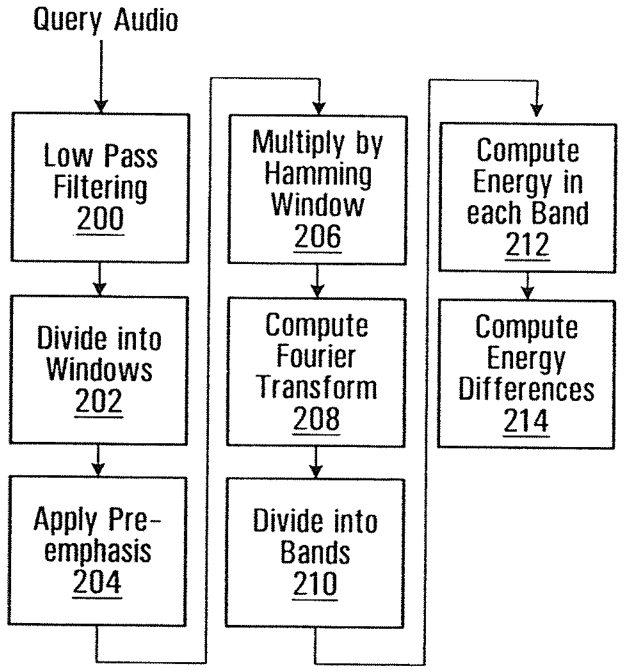
FIG. 2 is a flowchart illustrating the steps of a method for computing audio fingerprints of an audio piece.

Two different audio fingerprints can be used. The first fingerprint is based on the energy difference in consecutive sub-bands of the audio signal (energy-difference fingerprint) and it is best suited for music search and other copy detection tasks. This energy-difference fingerprint has 15 bits/frame and is extracted by using the process illustrated in FIG. 2. The query audio signal is lowpass filtered at step 200 to 4 KHz. The signal is then divided into 25 ms windows with 10 ms frame advance, at step 202. A pre-emphasis of 0.97 is applied (to boost high frequencies by 6 dB/octave at step 204 to compensate for the −6 dB/octave spectral slope of the speech signal) and then multiplied by a Hamming window at step 206 before computing the Fourier transform at step 208. The spectrum between 300 Hz and 3000 Hz is divided into 16 bands using mel-scale, at step 210. (In this example, only the spectrum between 300 Hz and 3000 Hz is being used to provide robustness to various band limiting transformations). A triangular window is applied at step 212 to compute energy in each band. The energy differences between the sub-bands are used to compute the fingerprint, at step 214. If EB(n,m)

represents the energy value of the $n^{th}$ frame at the $m^{th}$ sub band, then the $m^{th}$ bit F(n, m) of the 15-bit fingerprint is given by;

$$F(n,m)=1, \text{ if } EB(n,m)-EB(n,m+1)>0,$$

$$\text{Otherwise, } F(n,m)=0.$$

While it is known to generate audio fingerprints based on energy differences that are expressed as 32 bits values, those fingerprints are less than optimal in the context of a fast search. The problem with 32 bits is that the likelihood of all the bits matching is low. As a result, fingerprints in very few frames match, even in matching segments. In order to get a good measure of match between the two segments, the total number of matching bits needs to be counted. This is likely to be computationally expensive and will cause the search to slow down. Using less than 32 bits leads to frequent matches of the fingerprints, and then just the counts of matching fingerprints can be used as a measure of closeness between two segments. This count goes down with the severity of the query transformations. However, the count remains high enough that it can be relied upon as a measure of match.

In a specific example of implementation, energy-difference fingerprints of 15 bits have been found satisfactory, however this should not be considered as limiting. Applications are possible where energy-difference fingerprints of more or less than 15 bits can be used.

To search for a test segment that matches a query a map is provided in the machine readable storage linking fingerprints in the query audio fingerprint set to frame positions. A map can be implemented by a hash function. For example, if the fingerprint for frame k of the query is $fp$, then hash($fp$)=k. In other words, for every fingerprint value (fingerprint $fp$ can have $2^{15}$ different values according to the above example), the hash function will return the frame number of the query with that hash value. If there is no query frame with that hash value, then the hash function will return a value of −1.

This hash function is beneficial to performing a fast search of best test segment that matches the query. For each frame j of the test, a count c(j) of total query frame matches is kept, when the first frame of the query starts at frame j of the test. If the test frame t has a fingerprint $fp1$, then the count c(t−hash($fp1$)) is incremented when hash($fp1$) is not −1. At the same time, the first and the last matching test frames of the query are updated, when the query starts at test frame t−hash($fp1$). Since more than one query frame can have the fingerprint $fp1$, hash($fp1$) can have multiple values, and therefore all the counts c(t−hash($fp1$)) are updated. The maximum count $c(t_1)$ for some test frame $t_1$ and the corresponding start and end test frames provides the best matching test segment. Accordingly, there are only three operations involved per test frame.

Figure 4:
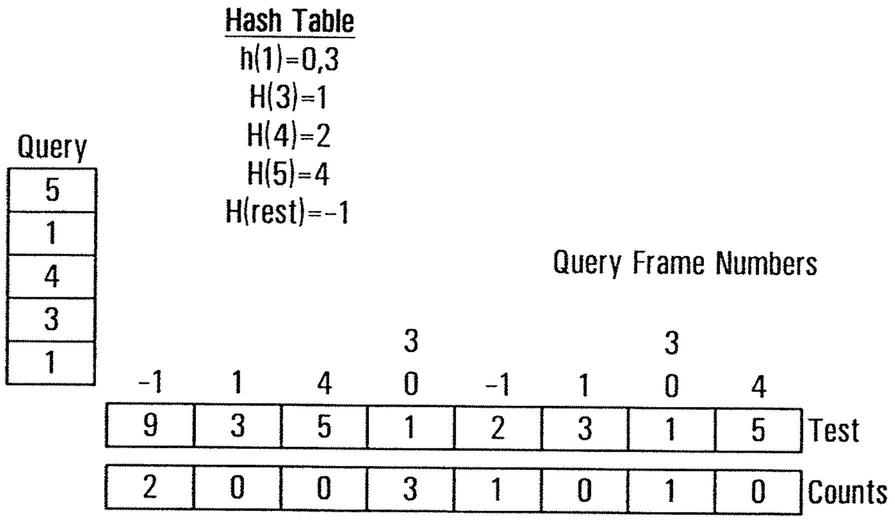
FIG. 4 illustrates a hash table used for matching frames of query audio to frames of audio fingerprints in a repository on the basis of energy-difference fingerprints.

A specific search example is illustrated at FIG. 4. In this figure, the frames on the vertical axis represent the query, while the frames on the horizontal axis represent the test. The numbers inside each frame represent the 15-bit energy difference values. For each test frame, a matching count is accumulated as if the query was overlaid on the test starting with that frame. For example, if the query is overlaid on the test starting with frame zero, then the total matching frames are two. Such a count is represented in the boxes in the bottom of the figure. As explained above, In order to get these counts, all the energy difference values for the query frames are hashcoded. The hashcodes for the given query are shown in the figure. Any energy-difference values that do not occur in the query are given a hash value of −1. The query frame number for each test frame is derived using this hashcode. Numbers on the top of the test frame represent the matching query frame numbers derived from this hashcode. The appropriate counts are then incremented based on these frame numbers. The test frame in the repository with the highest count is then identified as the one that corresponds to the query audio. In this search example, the best segment match has a count of 3.

Note that the process searches for a segment in the test that matches the query. Since the query is fixed, the count of the number of fingerprint matches in a segment is a good measure of the match. However, when a threshold is applied across many queries, then a better measure is the count/sec. The reason for this is simple, as query duration may vary from 3 sec to several minutes. Therefore, the distribution of matching fingerprint counts for test segments will be very different when the query lengths differ. Using counts/sec across queries helps to normalize the counts and leads to fewer false alarms and higher recall rate. The threshold for rejection/acceptance is based on counts/sec. For example, for the TRECVID 2008/2009 audio copy detection evaluation, this threshold was set at 1.88 counts/sec to avoid any false alarms. This threshold will vary depending on the search requirements.

The second audio fingerprint that can be used maps each frame of the audio segment to the closest frame of the query audio. This approach is more accurate than the energy-difference fingerprints, but is more computationally expensive. For computing this measure of closeness, 12 cepstral coefficients and normalized energy and its delta coefficients are computed. The distance between the query audio frame and the test audio frame is defined as the sum of the absolute difference between the corresponding cepstral parameters. If $a_1 \ldots a_n$ are the cepstral parameters for a query audio frame and $p_1 \ldots p_n$ are the cepstral parameters for an audio test frame, then this distance is computed as $$\sum_{i=1}^{n} |p_i - a_i|.$$

To each test audio segment frame is associated the closest query audio frame. This process is depicted by Algorithm 1, below in which "result" refers to the closest test audio frame and "n" is the $n^{th}$ cepstral coefficient:

Algorithm 1: Nearest Neighbor Computation

```
Data: advertisement frames, audio segment frames
Result: For each frame in the audio segment, the
        closest advertisement frame
for each f_prg ∈ program do
|    min ← ∞
|    for each f_ad ∈ test audio do
|    |    d ← ∞
|    |    for coeff ← 1 to n do
|    |    |    d ← d + |f_prg[coeff] − f_ad[coeff]|
|    |    end
|    |    if d < min then
|    |    |    results [f_prg] ← f_ad
|    |    |    min ← d
|    |    end
|    end
end
```

Computing the closest test audio frame for each query audio frame is computationally intensive. However, one may note that the search for the nearest test audio frame for each query audio frame can be done independently. Consequently, an alternate processor that is specialized in parallel computations may be used to outperform the speed offered by a modern CPU.

Modern graphic cards incorporate a specialized processor called Graphics Processing Unit (GPU). A GPU is mainly a Single Instruction, Multiple Data (SIMD) parallel processor that is computationally powerful, while being quite affordable.

One possible approach to implement the nearest neighbor computation is to use CUDA, a development framework for NVidia graphic cards (CUDA, "[online] http://www.nvidia.com/object/cuda_home.html."). The CUDA framework models the graphic card as a parallel coprocessor for the CPU. The development language is C with some extensions.

A program in the GPU is called a kernel and several programs can be concurrently launched. A kernel is made up of configurable amounts of blocks, each of which has a configurable amount of threads.

At execution time, each block is assigned to a multiprocessor. More than one block can be assigned to a given multiprocessor. Blocks are divided in groups of 32 threads called warps. In a given multiprocessor, 16 threads (half-warp) are executed at the same time. A time slicing-based scheduler switches between warps to maximize the use of available resources.

There are two kinds of memory. The first is the global memory which is accessible by all multiprocessors. Since this memory is not cached, it is beneficial to ensure that the read/write memory accesses by a half-warp are coalesced in order to improve the performance. The texture memory is a component of the global memory which is cached. The texture memory can be efficient when there is locality in data.

The second kind of memory is the shared memory which is internal to multiprocessors and is shared within a block. This memory, which is considerably faster than the global memory, can be seen as user-managed cache. This memory is divided into banks in such a way that successive 32-bit words are in successive banks. To be efficient, it is important to avoid conflicting accesses between threads. Conflicts are resolved by serializing accesses; this incurs a performance drop proportional to the number of serialized accesses.

Figure 7:
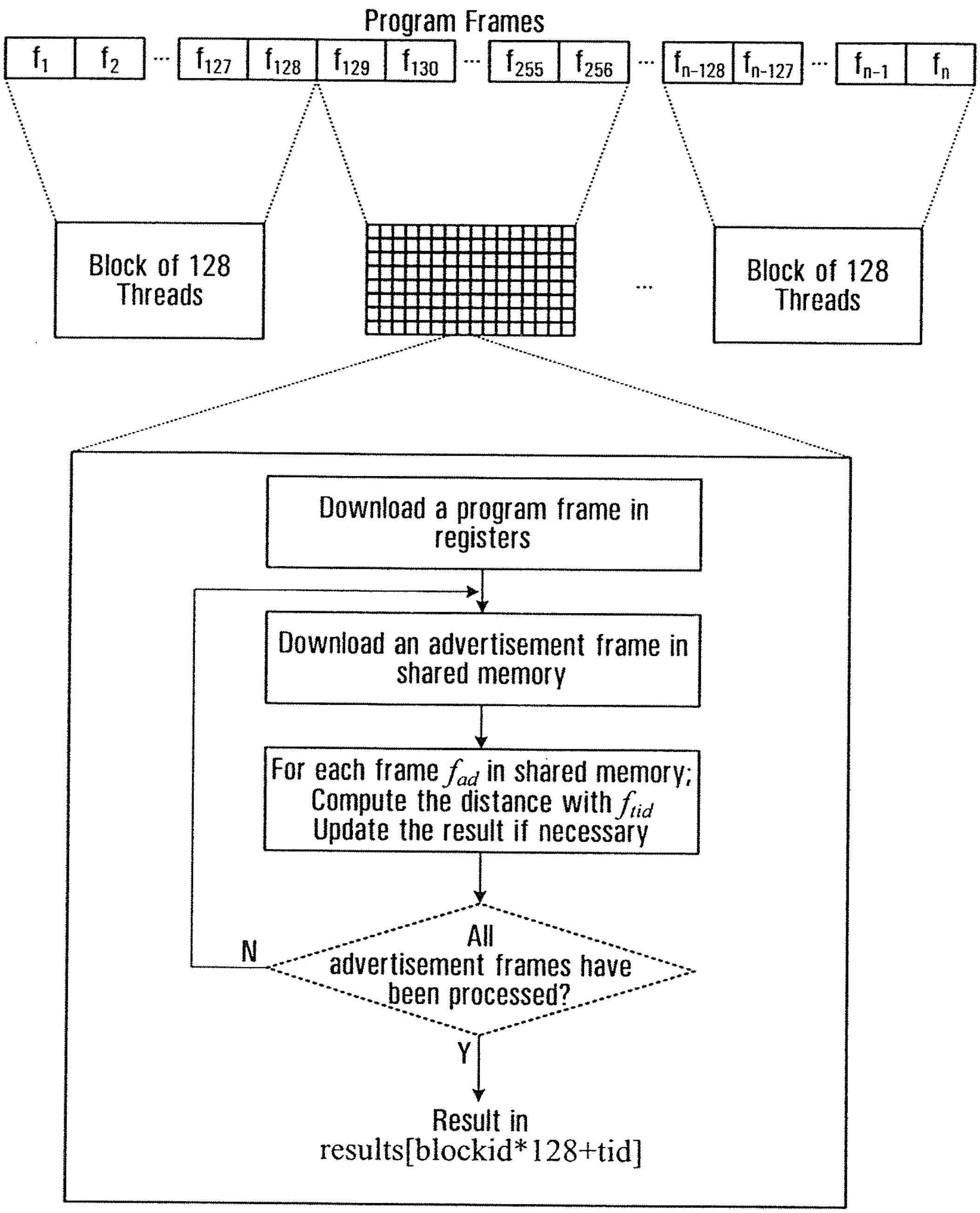
FIG. 7 is a block diagram illustrating the computations of a nearest-neighbor fingerprint on a GPU.

FIG. 7 illustrates how the computation of the nearest-neighbor is calculated in the GPU. In this figure, $t_{id}$ denotes the thread identifier for which the range is [0 . . . n], where n is the number of threads in the block. The value of blockId has the same meaning for all the blocks. In this case, the number of blocks is the number of audio segment frames divided by 128. The number 128 has been chosen to ensure that all the shared memory is used and to ensure efficient transfer of data from the global memory to the shared memory.

As a first step, the audio segment frames are divided into sets of 128 frames. Each set is associated with a multiprocessor running 128 threads. Thus, each thread computes the closest query frame for its associated test frame.

Each thread in the multiprocessor downloads one test audio frame from global memory. At this time, each thread can compute the distance between its audio segment frame and all of the 128 advertisement frames now in shared memory. This operation corresponds to lines 4 to 11 of Algorithm 1. Once all threads are finished, the next 128 advertisement frames are downloaded and the process is repeated.

To increase performance, it is possible to concurrently process several test audio segments and/or queries. A search algorithm that can be used is described in detail in (M. Héritier, V. Gupta, L. Gagnon, G. Boulianne, S. Foucher, P. Cardinal, "CRIM's content-based copy detection system for TRECVID", Proc. TRECVID-2009, Gaithersburg, Md., USA.) and in V. Gupta, G. Boulianne, and P. Cardinal, "Content-based audio copy detection using nearest-neighbor mapping," in Proceedings of International Conference on Acoustics, Speech and Signal Processing (ICASSP), 2010.

The search using the nearest-neighbor fingerprints is explained below. However, even with a GPU, the processing time is too long when a large set of data is considered. Another approach is to combine both fingerprints.

Figure 5:
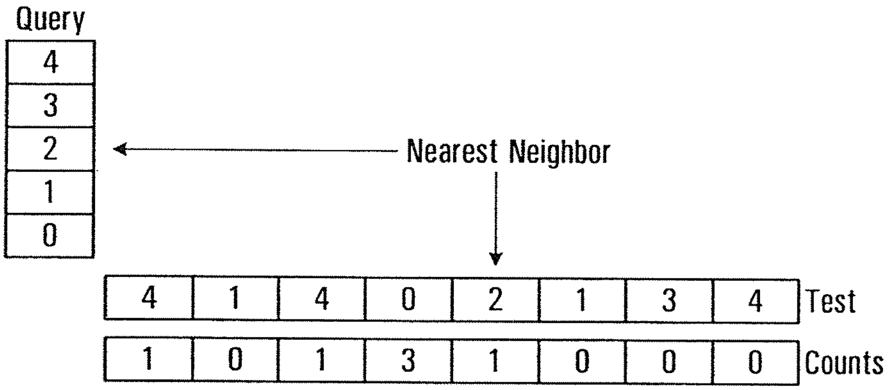
FIG. 5 graphically illustrates the process for matching the query audio to audio pieces in the repository using nearest neighbor fingerprints.

An example of a search for the test segment that matches the query is illustrated in FIG. 5. As before, a count c(i) is kept for each frame i of test as a possible starting point for the query. Assume that for each test frame i, m(i) is the query frame that is closest to the test frame i. Then for each test frame i the count c(i−m(i)) is incremented. We also update the starting test frame, and the last test frame corresponding to frame (i−m(i)). The count c(j) then corresponds to the number of matching frames between the test and the query if the query started at frame j. The frame j with the highest count c(j) and the corresponding start and end matching frames is the best matching segment.

In this example, the frames of the query are naturally labeled sequentially. Each frame of the test is labeled as the frame of query that best matches this frame. In the example, test frame zero matches frame four of the query. Once this labeling is complete, appropriate counts are incremented to find the frame with the highest count. In the given example, frame 3 of the test has the highest matching count.

The nearest-neighbor fingerprints are more accurate than the energy-difference fingerprints. However, even with a GPU, the processing time is too long when a large set of data is processed. In order to reduce this time, a two phase search is used. In the first phase, the search uses the energy-difference fingerprints, and then the second phase of the search rescores the matches found using the nearest-neighbor fingerprints. This reduces the computation time significantly while maintaining the search accuracy of nearest-neighbor fingerprints.

Figure 6:
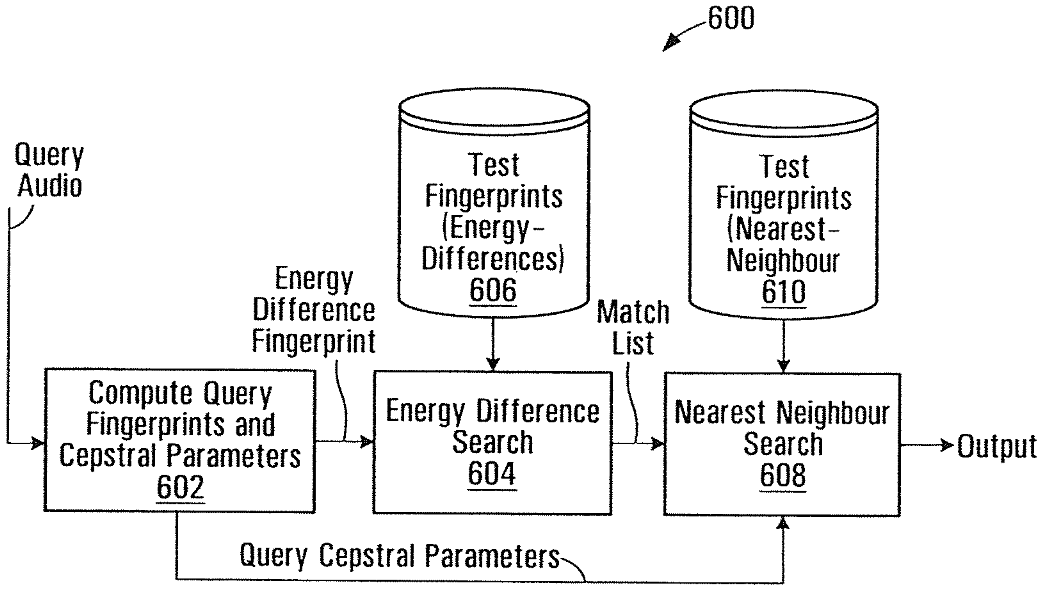
FIG. 6 is block diagram of a system that performs a two stage matching operation to determine if a query audio is a copy of an audio piece in a repository.

The process for performing this search is illustrated at FIG. 6. The process 600 computes energy difference fingerprints on the audio query at step 602 and also computes the cepstral parameters of the audio query. The energy-difference fingerprints are processed at step 604, while the cepstral parameters are processed at step 608. Step 604 tries to match the fingerprints against fingerprint sets in a repository 606, in the form of a machine readable storage where each fingerprint set is associated with an audio piece, namely a song or an ad. Therefore, step 604 outputs a match list which is a list of possible audio pieces that may be potential matches to the query audio. Step 608 is a re-scoring step where the potential matches are re-scored using near-neighbor fingerprints. As in the previous case, the process involves a computation of the fingerprints and performing a similarity measurement on the basis of the fingerprint sets in the repository 610. While the matching step 608 runs slower than the matching step 604, the number of fingerprint sets against which the query audio is compared is significantly less than at step 604. This approach yields good detection results since it combines both the speed of the energy-difference fingerprints with the greater accuracy of the near-neighbor fingerprints. In terms of implementation, the match list that is output from step 604 is processed at step 608 to identify the corresponding set of near-neighbor fingerprints in the repository 610 that will form the set of test audio data against which the query audio will be compared. The basic idea is to limit the matching process only to a subset of the fingerprint sets that were identified at the earlier stage as likely to match the query audio.

Tests have been performed with copy detection systems according to the invention in order to assess their performance. The test data used for the performance assessment for copy detection comes from NIST-sponsored TRECVID 2008 and 2009 evaluations ("Final CBCD Evaluation Plan TRECVID 2008", Jun. 3, 2008, [online] www.nlpir.nist.gov/projects/tv2008/Evaluation-cbcd_v1.3.htm) (W. Kraaij, G. Awad, and P. Over, "TRECVID-2008 Content-based Copy Detection", [online]. www-nlpir.nist.gov/projects/tvpubs/tv8.slides/CBCD.slides.pdf) (A. Smeaton, P. Over, and W. Kraaij, "Evaluation campaigns and TRECVid". In Proc. 8th ACM International Workshop Multimedia Information Retrieval (Santa Barbara, Calif.). MIR '06. ACM Press, New York. (http://doi.acm.org/10.1145/1178677.1178722). Most of this data was provided by the Netherlands Institute for Sound and Vision and contains news magazine, science news, news reports, documentaries, educational programming, and archival video encoded in MPEG-1. Other data comes from BBC archives containing five dramatic series. All together, there are 385 hours of video and audio. Both the 2008 and 2009 audio queries contain 201 original queries. The queries for the 2009 submission are different from the 2008 queries. Each audio query goes through seven different transformations for a total of 1,407 audio-only queries. The seven audio transformations for 2008 and 2009 are shown in table 1 below.

TABLE 1

| Transform | Description |
|---|---|
| T1 | nothing |
| T2 | mp3 compression |
| T3 | mp3 compression and multiband companding |
| T4 | bandwidth limit and sigle-band companding |
| T5 | Mix with speech |
| T6 | mix with speech, then multiband compress |
| T7 | bandpass filter, mix with speech, compress |

In the specific context of detection of copyrighted material (such as songs or movies), the system was developed using audio queries from TRECVID 2008. These are 1,407 queries (201 queries*7 transforms). Since query 166 occurred twice in the test, it was removed from the development set. The duration statistics for the 2008 and 2009 queries are shown in table 2 below.

TABLE 2

| query | average | min | Max | total |
|---|---|---|---|---|
| 2008 queries | 77.2 sec | 3 sec | 179 sec | 108608 sec (30 hrs 10 min 8 sec) |
| 2009 queries | 81.4 sec | 4.7 sec | 179 sec | 114421 sec (31 hrs 47 min 1 sec) |

Evaluation Criteria

The submissions were evaluated using the minimal normalized detection cost rate (NDCR) computed as:

$$NDCR=P_{Miss}+\beta \cdot R_{FA}$$

The $P_{Miss}$ is the probability of a miss error, and $R_{FA}$ is the false alarm rate. β is a constant depending on the test conditions. For example, for no false alarm (no FA) case, β was set to 2000. In this case, even at a low false alarm rate, the value of NDCR will go up dramatically. So in the no FA case, the optimal threshold always corresponded to a threshold where there were no false alarms. In other words, in the no FA case, the minimal NDCR value corresponded to $P_{Miss}$ at the minimal threshold where there were no false alarms. This optimal threshold is computed separately for each transform, so the optimal threshold could be different depending on the transform. There were two different evaluations: optimal and actual. In the actual case, an a priori threshold was provided based on 2008 queries. In the actual case where a priori threshold was provided, this threshold was used for all the transforms to compute the NDCR. If there are any false alarms at that threshold, then the NDCR will be very high, leading to poor results.

For the balanced case, β was set to 2. In computing results, it was found that even for the balanced case, the optimal result turned out to be at the threshold where there were no false alarms. In other words, optimal no FA and balanced results in the case were the same. For detailed evaluation criteria, please see [17].

All the results for the 2008 queries were computed using the software provided by NIST. This software computes the optimal minimal NDCR value for each transform and outputs the results. For the 2009 queries, all the results were computed by NIST.

Results—Energy Difference Fingerprint

The query audio detection using energy difference fingerprints was run on 1,400 queries from 2008 and 385 hours of test audio from TRECVID. The results were compiled for the no FA case. The no FA results were established separately for each transform. Results are also provided when one threshold is used for all the transforms. This corresponds to the real life situation where the transformation that the query has gone through is not known.

For no FA case, results for each transform are given in table 3 below, where the decision threshold for each transform is computed separately.

TABLE 3

| | Transform | | | | | | |
|---|---|---|---|---|---|---|---|
| | 1 | 2 | 3 | 4 | 5 | 6 | 7 |
| min NDCR | .007 | .007 | .030 | .022 | .060 | .053 | .053 |

The first four transforms do not have any extraneous speech added, while the last three add extraneous speech to the query. For the first two transforms, the number of missed test segments is less than 1%. Even for transforms with extraneous speech added, the worst result is 6% missed segments. In no FA case, the minimal normalized detection cost rate (NDCR) corresponds to a threshold with no false alarms: all the errors are due to missed test segments corresponding to the queries. The table below shows minimal NDCR when there is one threshold for all the transforms. In this case the minimal NDCR value more than doubles for the last three transforms.

TABLE 4

| | Transform | | | | | | |
|---|---|---|---|---|---|---|---|
| | 1 | 2 | 3 | 4 | 5 | 6 | 7 |
| min NDCR | .015 | .037 | .037 | .022 | .127 | .135 | .165 |

In order to explain this increase in min NDCR, it is worth considering the distribution of counts for the matching test segments. The table below shows the total number of test segments that match the queries with a given count.

TABLE 5

| | Count N | | | | | |
|---|---|---|---|---|---|---|
| | 31 | 35 | 45 | 55 | 75 | 100 |
| segments | 738464 | 354898 | 133572 | 74480 | 16492 | 1796 |

Over 350,000 test segments have a matching count of 35. The counts for matching segments vary between 32 and 2,300. It is worth noting that the counts are consistent: the correct segment has a higher count than the incorrect segments. However, one-third of the queries have no matching segment in the test. This implies that some of these queries could have high counts/sec. that could be higher than other queries with correct matching segments in the test. It so happens that counts/sec. for the first four transforms is higher because they do not have any added speech. Queries that correspond to the first four transforms that have no matching test segments could lead to high rejection threshold that affects the performance of queries that have undergone one of the last three transforms, which is actually the case. The highest count/sec. for a query that is a false alarm is 1.88/sec. for a query with transform 4. Many correct segments for the last three transforms have counts/sec. that are less than 1.88. The number of missed queries with counts/sec. below 1.88 can be calculated by dividing the min NDCR in Table 4 by 0.007.

The average query processing time for the energy difference fingerprints is 15 seconds on an Intel Core 2 quad 2.66 GHz processor (a single processor). For searching through 385 hours of audio, this search speed is very fast.

Results—Nearest Neighbor (NN) Fingerprint

The copy detection using NN-based fingerprints was run on the same 2008 queries and 385 hours of test data. The results in Table 6 for one optimized threshold per transform are better than those in Table 3 for the energy difference fingerprints.

TABLE 6

| | Transform | | | | | | |
|---|---|---|---|---|---|---|---|
| | 1 | 2 | 3 | 4 | 5 | 6 | 7 |
| Min NDCR | 0.007 | 0 | 0.007 | 0.007 | 0.022 | 0 | 0.03 |

Results for one threshold across all transforms are shown in the first row of Table 7.

TABLE 7

| | Transform | | | | | | |
|---|---|---|---|---|---|---|---|
| | 1 | 2 | 3 | 4 | 5 | 6 | 7 |
| NN-based | .007 | 0 | .015 | .015 | .022 | 0 | .03 |
| NN-based rescore | .007 | 0 | .007 | .007 | .037 | .03 | .03 |

These results are nearly the same as those for one threshold per transform, except for a small increase in the minimal NDCR value for transforms 3 and 4. One surprising result is that no segments for transform 6 are missed even though extraneous speech has been added to the queries with this transformation.

The computing expense required for finding the query frame closest to the test frame is significantly higher than that for the energy difference fingerprint. To reduce this expense, the process was implemented on a GPU with 240 processors and 1 Gbyte of memory as discussed earlier. The nearest neighbor computation lends itself easily to parallelization. The resulting average compute time per query is 360 seconds when the fingerprint uses 22 features (12 cepstral features+normalized energy+9 delta cepstra). Even though these parameters are very accurate, they are slower to compute than the energy difference parameters. As we reduce the number of features used to compute the nearest query frame, the results get worse. Table 8 gives the minimal NDCR value for 13 features (12 cepstral features+normalized energy).

TABLE 8

| | Transform | | | | | | |
|---|---|---|---|---|---|---|---|
| | 1 | 2 | 3 | 4 | 5 | 6 | 7 |
| min NDCR | .007 | 0 | .022 | .022 | .022 | .007 | .03 |

The computing time can be reduced by rescoring the results from energy difference parameters with the NN-based features. Rescoring lowers average compute time/query to 20 sec. (15 sec. on CPU+5 sec. on GPU). Even for rescoring using NN-based features, the NN features are computed using a GPU. Minimal NDCR is shown in the second row of Table 7. Compared to energy difference feature (see Table 4), minimal NDCR has dropped significantly.

Table 9 illustrates why NN-fingerprints give such good results. This table shows the total number of test segments that match one of the 2008 audio queries and have a given count.

TABLE 9

| | count N | | | | | |
|---|---|---|---|---|---|---|
| | 11 | 20 | 25 | 30 | 35 | 40 |
| segments | 12147 | 71 | 61 | 22 | 36 | 28 |

It should be noted that the number of test segment matches with a given count drops dramatically with increasing counts. The count threshold for no false alarms (no FA) is 23. This implies that none of the queries that are imposters have a matching segment with a count higher than 23. For 2009 queries also, this highest count for false alarms turned out to be 23. When the energy-difference parameter is rescored with NN fingerprints, this highest imposter segment count goes down to 14 (i.e., some of the high scoring imposter queries are filtered out by energy difference parameter). For 2009 queries, it turns out that this highest count was 11, showing the robustness of this feature. Using counts/sec instead of counts increased the minimal NDCR. Counts itself is a good measure of copy detection for nearest-neighbor fingerprint, even across queries of different lengths. Therefore, counts have been used as a confidence measure for the nearest-neighbor fingerprints. (Note all the previous results with the NN-fingerprints use counts). The total number of missed queries with counts below 23 for each transform can be computed by dividing the minimal NDCR in table 7 by 0.007. So the NN-based fingerprints generate false alarms with low counts, and the boundary between false alarms and correct detection is well marked.

Since rescoring energy-difference fingerprints with NN-based fingerprints results in very fast compute times (20 sec./query) and low NDCR, one run was submitted for no FA and one for the balanced case using this rescoring for TRECVID 2009 copy detection evaluation. The only difference between the two submissions was the threshold: for no FA, the threshold corresponds to the count for correct detection just above the highest count for any false alarm (for 2008 queries). For a balanced case, the threshold corresponds to the highest count for any false alarm (for 2008 queries). Table 10 shows the results for 2009 queries.

TABLE 10

| | Transform | | | | | | |
|---|---|---|---|---|---|---|---|
| | 1 | 2 | 3 | 4 | 5 | 6 | 7 |
| avg proc time | 20.4 | 20.3 | 20.3 | 20.5 | 20.9 | 21.2 | 21 |
| mean F1 | .921 | .936 | .924 | .89 | .92 | .90 | .90 |
| opt min NDCR | .052 | .06 | .067 | .06 | .06 | .075 | .082 |
| actual min NDCR | .052 | .06 | .075 | .06 | .06 | .09 | .082 |
| threshold | 17 | 17 | 17 | 17 | 17 | 17 | 17 |

The results show optimal NDCR and actual NDCR using the thresholds from 2008 queries. The threshold set for computing the actual NDCR is a count of 17 as shown in the last row. First, the optimal results for no FA and for balanced cases are exactly the same. Second, the optimal and actual min NDCR are the same, except for a small difference for transforms three and six. This means that the count of 17 is very close to the optimal threshold for all the transforms. Also, the mean processing time is 20.5 sec. (15.5 sec. on CPU and 5 sec. on GPU). It turns out that these results are the best results for both computing speed and for minimal NDCR. For 2009 queries, the highest score for false alarms turns out to be 11, which is even lower than the score of 14 for the 2008 queries.

Since the results for NN-based feature search are the best and most reliable, one no FA submission was submitted using NN-based features computed using 22 cepstral features. Table 11 shows results for this case.

TABLE 11

| | Transform | | | | | | |
|---|---|---|---|---|---|---|---|
| | 1 | 2 | 3 | 4 | 5 | 6 | 7 |
| mean proc time | 376 | 376 | 376 | 376 | 376 | 376 | 376 |
| mean F1 | .921 | .93 | .92 | .89 | .925 | .88 | .90 |
| opt min NDCR | .052 | .052 | .067 | .06 | .052 | .067 | .075 |
| actual min NDCR | .052 | .06 | .075 | .067 | .052 | .075 | .082 |
| threshold | 25 | 25 | 25 | 25 | 25 | 25 | 25 |

Compared to the submission that rescores using NN-based features, these results are slightly better for many transforms. However, the overall computing expense has risen from 20.5 sec./query to 376 sec./query. The last row shows the count of 25 that was set as a threshold to use for the actual case. Here also, the actual and optimal min NDCR values are very close, showing that the count of 25 is very close to the optimal threshold for each transform.

Fusion of Energy Difference and NN-Based Fingerprints Results

The two results were fused by combining the counts/sec. from energy-difference fingerprints with counts from NN-based fingerprints. The counts/sec. are multiplied by 15 to achieve a proper balance. Each fingerprint generates 0 or 1 matching segments per query. For segments common in the two fingerprints (same query, overlapping test segment), the weighted scores is added and then the segment corresponding to the NN-based fingerprints is output. For segments not in common, the segment with the best weighted score is output. The results for no FA case for 2008 queries are shown in Table 12.

TABLE 12

| | Transform | | | | | | |
|---|---|---|---|---|---|---|---|
| | 1 | 2 | 3 | 4 | 5 | 6 | 7 |
| min NDCR | .007 | 0 | .007 | 0 | .022 | 0 | .015 |

The results for no FA with just one threshold across all transformations is shown in Table 13.

TABLE 13

| | Transform | | | | | | |
|---|---|---|---|---|---|---|---|
| | 1 | 2 | 3 | 4 | 5 | 6 | 7 |
| min NDCR | .007 | 0 | .007 | 0 | .022 | 0 | .022 |

When Tables 7 and 13 are compared, one can appreciate the significant reduction in minimal NDCR due to fusion. If one averages across all transformations, the minimal NDCR value decreases from 0.016 to O.OOS. Table 14 compares this averaged minimal NDCR for energy difference fingerprints versus NN-based fingerprints versus the fused results for 2008 queries.

TABLE 14

| Method | min NDCR | avg CPU time |
|---|---|---|
| energy diff fingerprints | 0.077 | 15 sec |
| energy diff + NN-based 2$^{nd}$ pass | 0.017 | 20 sec |
| NN-based fingerprints | 0.016 | 360 sec |

TABLE 14-continued

| Method | min NDCR | avg CPU time |
|---|---|---|
| fused results | 0.008 | 375 sec |

Note that rescoring results from energy-difference features with NN-based features results in only a small increase in computing while reducing minimal NDCR from 0.077 to 0.017.

In addition, a further submission was made using this fusion for the balanced case for 2009 queries. The results are shown in Table 15.

TABLE 15

| | Transform | | | | | | |
|---|---|---|---|---|---|---|---|
| | 1 | 2 | 3 | 4 | 5 | 6 | 7 |
| mean proc time | 390 | 389 | 389 | 389 | 390 | 389 | 390 |
| mean F1 | .921 | .93 | .92 | .88 | .925 | .88 | .90 |
| opt min NDCR | .052 | .052 | .06 | .052 | .052 | .052 | .082 |
| actual min NDCR | .052 | .052 | .06 | .06 | 0.52 | .075 | .137 |
| threshold | 28.6 | 28.6 | 28.6 | 28.6 | 28.6 | 28.6 | 28.6 |

The results are good except for the actual minimal NDCR results for transform seven. The threshold given for the actual case was 28.6 as shown in the table and the compute time per query is 390 sec.

Table 16 summarizes the results for the four submissions for 2009 audio queries.

TABLE 16

| Method | opt min NDCR | actual min NDCR | avg CPU time |
|---|---|---|---|
| energy diff + NN-based $2^{nd}$ pass | 0.065 | 0.068 | 20.5 sec |
| NN-based fingerprints | 0.0607 | 0.066 | 376 sec |
| fused results | 0.057 | 0.070 | 390 sec |

For optimal minimal and actual minimal NDCR, average the NDCR is averaged across all transformations in order to see the relative advantage of each algorithm. The optimal minimal NDCR value keeps decreasing with the improved algorithms. However, the actual minimal NDCR value goes up for the fused results due to transform 7. This was due to false alarms that were above the given threshold. This was brought about by the energy-difference parameter. The variability of imposter counts for energy difference fingerprints was the primary reason for not submitting any runs with energy-difference parameter alone, even though they are the fastest to compute. Note also that the average processing time per query is 20.5 sec. (row 1), while the average query duration is 81.4 sec. So the copy detection algorithms are four times faster than real-time. In other words, one processor can process four queries simultaneously.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A method for performing audio copy detection, comprising:

a) providing a query audio data unit having a succession of query frames;

b) providing a plurality of test audio data units each including a succession of test frames;

c) for each test frame, determining one of the query frames as corresponding to said test frame;

d) for each of the test audio data units, determining a similarity between the succession of query frames and the query frames corresponding to the succession of test frames of the test audio data unit by (1) aligning the query frames in the succession of query frames with the query frames corresponding to the succession of test frames; (2) comparing aligned pairs of query frames; (3) determining a count of the number of times that an aligned pair of query frames is the same;

e) selecting, at least in part on the basis of the similarity for each of the test audio data units, a particular one of the test audio data units as a match for the query audio data unit.

2. The method defined in claim 1, further comprising repeating steps (1), (2) and (3) for a plurality of different alignments, thereby to obtain a count for each alignment.

3. The method defined in claim 2, wherein the similarity for the given test audio data unit is proportional to the largest obtained count.

4. The method defined in claim 1, wherein selecting a particular one of the test audio data units as a match for the query audio data unit comprises selecting as the particular one of the test audio data units the test audio data unit for which the similarity is the highest.

5. A method for performing audio copy detection, comprising:

a) providing a query audio data unit having a succession of query frames;

b) providing a plurality of test audio data units each including a succession of test frames;

c) for each test frame, determining one of the query frames as corresponding to said test frame;

cm d) for each of the test audio data units, determining a similarity between the succession of query frames and the query frames corresponding to the succession of test frames of the test audio data unit by (1) aligning the query frames in the succession of query frames with the query frames corresponding to the succession of test frames; (2) comparing aligned pairs of query frames; (3) determining a count of the number of times that an aligned pair of query frames is the same; (4) where the count is at least as great as two, determining the distance, in terms of the number of frames, that separates the two most distant aligned pairs of query frames that are the same; (5) determining a quotient of the count and the distance;

e) selecting, at least in part on the basis of the similarity for each of the test audio data units, a particular one of the test audio data units as a match for the query audio data unit.

6. The method defined in claim 5, further comprising repeating steps (1), (2), (3), (4) and (5) for a plurality of different alignments, thereby to obtain a quotient for each alignment.

7. The method defined in claim 6, wherein the similarity for the given test audio data unit is proportional to the largest obtained quotient.

8. The method defined in claim 1, wherein, for each test frame, determining one of the query frames as corresponding to said test frame comprises determining the query frame that best matches the test frame.

9. The method defined in claim 8, wherein the query frame that best matches the test frame is the query frame, among all of the query frames, having the smallest energy difference with respect to the test frame.

10. The method defined in claim 8, wherein the query frame that best matches the test frame is the query frame, among all of the query frames, that is the nearest neighbor with respect to the test frame.

11. A method for performing audio copy detection, comprising:

providing a query audio data unit having a succession of query frames, and providing a set of query fingerprints corresponding to respective ones of the query frames, each query fingerprint characterizing the respective query frame;

providing a plurality of test audio data units each including a succession of test frames, and for each test audio data unit, providing a set of test fingerprints corresponding to respective ones of the test frames, each test fingerprint further corresponding to one of the query fingerprints;

for each of the test audio data units, determining a similarity between the query fingerprints and the test fingerprints of the test audio data unit, wherein determining a similarity between the query fingerprints and the test fingerprints of the test audio data unit comprises the steps of (1) aligning a particular one of the query fingerprints with a particular one of the test fingerprints; (2) comparing aligned pairs of fingerprints; (3) determining a count of the number of times that an aligned pair of fingerprints has the same value;

selecting, at least in part on the basis of the similarity for each of the test audio data units, a particular one of the test audio data units as a match for the query audio data unit.

12. A method for performing audio copy detection, comprising:

providing a query audio data unit having a succession of query frames, and providing a set of query fingerprints corresponding to respective ones of the query frames, each query fingerprint characterizing the respective query frame;

providing a plurality of test audio data units each including a succession of test frames, and for each test audio data unit, providing a set of test fingerprints corresponding to respective ones of the test frames, each test fingerprint further corresponding to one of the query fingerprints;

for each of the test audio data units, determining a similarity between the query fingerprints and the test fingerprints of the test audio data unit, wherein determining a similarity between the query fingerprints and the test fingerprints of the test audio data unit comprises the steps of (1) aligning a particular one of the query fingerprints with a particular one of the test fingerprints; (2) comparing aligned pairs of fingerprints; (3) determining a count of the number of times that an aligned pair of fingerprints has the same value; (4) where the count is at least as great as two, determining the distance, in terms of the number of fingerprints, that separates the two most distant aligned pairs of fingerprints; (5) determining a quotient of the count and the distance; and selecting, at least in part on the basis of the similarity for each of the test audio data units, a particular one of the test audio data units as a match for the query audio data unit.

13. The method defined in claim 5, wherein, for each test frame, determining one of the query frames as corresponding to said test frame comprises determining the query frame that best matches the test frame.

14. The method defined in claim 13, wherein the query frame that best matches the test frame is the query frame, among all of the query frames, having the smallest energy difference with respect to the test frame.

15. The method defined in claim 13, wherein the query frame that best matches the test frame is the query frame, among all of the query frames, that is the nearest neighbor with respect to the test frame.

16. An apparatus for performing audio copy detection, comprising:

an input for receiving a query audio data unit having a succession of query frames;

machine readable storage holding a plurality of test audio data units each including a succession of test frames;

the machine readable storage encoded with software for execution by a CPU for (i) for each test frame, determining one of the query frames as corresponding to said test frame; (ii) for each of the test audio data units, determining a similarity between the succession of query frames and the query frames corresponding to the succession of test frames of the test audio data unit by (1) aligning the query frames in the succession of query frames with the query frames corresponding to the succession of test frames; (2) comparing aligned pairs of query frames; (3) determining a count of the number of times that an aligned pair of query frames is the same; and (iii) selecting, at least in part on the basis of the similarity for each of the test audio data units, a particular one of the test audio data units as a match for the query audio data unit;

an output for releasing information conveying the particular one of the test audio data units that was selected as a match for the query audio data unit.

17. An apparatus for performing audio copy detection, comprising:

an input for receiving a query audio data unit having a succession of query frames;

machine readable storage holding a plurality of test audio data units each including a succession of test frames;

the machine readable storage encoded with software for execution by a CPU for (i) for each test frame, determining one of the query frames as corresponding to said test frame; (ii) determining a similarity between the succession of query frames and the query frames corresponding to the succession of test frames of the test audio data unit by (1) aligning the query frames in the succession of query frames with the query frames corresponding to the succession of test frames; (2) comparing aligned pairs of query frames; (3) determining a count of the number of times that an aligned pair of query frames is the same; (4) where the count is at least as great as two, determining the distance, in terms of the number of frames, that separates the two most distant aligned pairs of query frames that are the same; (5) determining a quotient of the count and the distance; and (iii) selecting, at least in part on the basis of the similarity for each of the test audio data units, a particular one of the test audio data units as a match for the query audio data unit;

an output for releasing information conveying the particular one of the test audio data units that was selected as a match for the query audio data unit.

18. An apparatus for performing audio copy detection, comprising:

an input for receiving a query audio data unit having a succession of query frames; and a set of query fingerprints corresponding to respective ones of the query frames, each query fingerprint characterizing the respective query frame;

machine readable storage holding:

a plurality of test audio data units each including a succession of test frame; and for each test audio data unit, a set of test fingerprints corresponding to respective ones of the test frames, each test fingerprint further corresponding to one of the query fingerprints;

the machine readable storage encoded with software for execution by a CPU for (i) for each of the test audio data units, determining a similarity between the query fingerprints and the test fingerprints of the test audio data unit, wherein determining a similarity between the query fingerprints and the test fingerprints of the test audio data unit comprises the steps of (1) aligning a particular one of the query fingerprints with a particular one of the test fingerprints; (2) comparing aligned pairs of fingerprints; (3) determining a count of the number of times that an aligned pair of fingerprints has the same value; and (ii) selecting, at least in part on the basis of the similarity for each of the test audio data units, a particular one of the test audio data units as a match for the query audio data unit;

an output for releasing information conveying the particular one of the test audio data units that was selected as a match for the query audio data unit.

19. An apparatus for performing audio copy detection, comprising:

an input for receiving a query audio data unit having a succession of query frames; and a set of query fingerprints corresponding to respective ones of the query frames, each query fingerprint characterizing the respective query frame;

machine readable storage holding:

a plurality of test audio data units each including a succession of test frame; and for each test audio data unit, a set of test fingerprints corresponding to respective ones of the test frames, each test fingerprint further corresponding to one of the query fingerprints;

the machine readable storage encoded with software for execution by a CPU for (i) for each of the test audio data units, determining a similarity between the query fingerprints and the test fingerprints of the test audio data unit, wherein determining a similarity between the query fingerprints and the test fingerprints of the test audio data unit comprises the steps of (1) aligning a particular one of the query fingerprints with a particular one of the test fingerprints; (2) comparing aligned pairs of fingerprints; (3) determining a count of the number of times that an aligned pair of fingerprints has the same value; (4) where the count is at least as great as two, determining the distance, in terms of the number of fingerprints, that separates the two most distant aligned pairs of fingerprints; (5) determining a quotient of the count and the distance; and (ii) selecting, at least in part on the basis of the similarity for each of the test audio data units, a particular one of the test audio data units as a match for the query audio data unit;

an output for releasing information conveying the particular one of the test audio data units that was selected as a match for the query audio data unit.

* * * * *